(12) United States Patent
Schumacher et al.

(10) Patent No.: US 6,561,048 B2
(45) Date of Patent: May 13, 2003

(54) WATER-FLOW TESTING APPARATUS (75) Inventors: Thomas Phillip Schumacher, Madisonville, KY (US); David Wayne Meece, Madisonville, KY (US); Steven Craig Mertz, Hopkinsville, KY (US)

(73) Assignee: General Electric Company, Schenectady, NY (US)

( * ) Notice: Subject to any disclaimer, the term of this patent is extended or adjusted under 35 U.S.C. 154(b) by 137 days.

(21) Appl. No.: 09/757,186

(22) Filed: Jan. 9, 2001

(65) Prior Publication Data
US 2002/0088270 A1 Jul. 11, 2002

(51) Int. Cl.[7] ............................................. G01M 19/00
(52) U.S. Cl. ........................ 73/865.9; 73/37; 73/49.7; 73/118.1; 73/119 R
(58) Field of Search ................. 73/37, 865.9, 49.7, 73/118.1, 119 R, 147, 168

(56) References Cited

U.S. PATENT DOCUMENTS

| 1,794,100 A | * | 2/1931 | Bennington | .................... | 73/40 |
| 2,635,454 A | * | 4/1953 | Ford | .......................... | 73/1.19 |
| 2,835,234 A | * | 5/1958 | Rasch et al. | ............. | 123/41.42 |
| 3,926,036 A | * | 12/1975 | Bower | ............................ | 73/37 |
| 4,126,038 A | * | 11/1978 | Bartlett et al. | ............ | 73/168 X |
| 4,450,710 A | * | 5/1984 | Nettekoven | .................... | 73/37 |
| 4,480,464 A | * | 11/1984 | Whisenand et al. | ........... | 73/40 |
| 4,655,078 A | * | 4/1987 | Johnson | ........................ | 73/168 |
| 4,893,494 A | * | 1/1990 | Hart | ........................... | 73/37 X |
| 5,020,362 A | * | 6/1991 | Hart et al. | ................ | 73/49.7 X |
| 6,418,804 B1 | * | 7/2002 | Zabala et al. | ................ | 73/37 X |

FOREIGN PATENT DOCUMENTS

EP      122551   * 10/1984   ................. 73/49.7

* cited by examiner

*Primary Examiner*—Thomas P. Noland
(74) *Attorney, Agent, or Firm*—V. G. Ramaswamy; Gregory O. Garmong (57) ABSTRACT

A water-testing apparatus tests an article such as a turbine airfoil component having at least two water flow passage article inlets. The apparatus includes an apparatus body having a water inlet, and an attachment head integral with the apparatus body. The attachment head includes a holder that receives the article therein in sealing contact with an article seal, and at least two ports, each port being in registry with at least one of the at least two water flow passage article inlets. A water flow controller within the apparatus body has a controller inlet in water-flow communication with the water inlet, at least two controller outlets, each controller outlet being in water-flow communication with one of the ports of the attachment head, and a flow-control valve disposed in a water flow path between the controller inlet and the controller outlets. The flow-control valve is controllable to controllably connect a single one of the controller outlets at a time to the controller inlet.

8 Claims, 6 Drawing Sheets

WATER-FLOW TESTING APPARATUS

This invention relates to the water-testing of an article by running a flow of water through the article, and more particularly to the water-testing of a hollow turbine airfoil component having multiple flow channels therethrough.

BACKGROUND OF THE INVENTION

Some types of turbine airfoil components are made hollow with air flow channels therethrough, extending from the base of the turbine airfoil component to openings at various locations on the surface of the turbine airfoil component. During service, a flow of cooling air is introduced into the air flow channels at the base. The cooling air flows through the interior of the turbine airfoil component to emerge from the openings. Heat is removed from the turbine airfoil component by the air flow. Additionally, the air flow from the openings provides a film of cool air over the surface of the turbine airfoil component to protect it from hot combustion gases.

The hollow interior of the turbine airfoil component is typically divided into multiple regions, both to provide internal structural stiffening and also to define separate air flow channels. The separate air flow channels may lead, for example, to respective sets of exterior surface openings along the leading edge of the turbine airfoil component, along the trailing edge of the turbine airfoil component, and along the concave or pressure-side of the turbine airfoil component which is directly contacted by the flow of hot combustion gases.

The turbine airfoil component is typically manufactured by casting it with the internal air flow channels in place, and then drilling the openings from the exterior surface to the air flow channels. The turbine airfoil component is thereafter coated on portions of its exterior surface, and optionally on its interior surface of the air flow channels. The coatings form protective layers and possibly insulating layers on the surfaces, to extend the life of the turbine airfoil component.

At various stages of the manufacturing operation, the turbine airfoil component is water tested to ensure that the openings from the gas-flow channels to the exterior surface are clear and free from blockage. Blocked or nearly blocked openings may result, for example, from a defect when the opening is formed or from a partial or complete closure of the opening during the coating process. In water testing, the base of the turbine airfoil component is held in a fixture to a water source, and water flows along generally the same flow path as air flows in service, from the base, through the air flow channels, and out the openings. The water flow out of the openings is observed to determine whether the flow from each and every opening is sufficient and indicative of an unobstructed opening.

In the work leading to this invention, the inventors have observed that in some cases it is very difficult to visualize the flow from each of the openings served by the various flow air channels. Consequently, it is difficult to be certain that the openings are properly sized and free of obstructions. Accordingly, there is a need for a better technique and apparatus for testing water flow through such hollow articles. The present invention fulfills this need, and further provides related advantages.

SUMMARY OF THE INVENTION

The present invention provides an apparatus and method for water-flow testing of hollow articles such as turbine airfoil components with multiple internal water-flow channels. The present approach allows the water flow through the various sets of openings to be more readily visualized. Additionally, the apparatus is mechanically easier to use than available conventional devices.

A water-flow testing apparatus for testing an article having at least two water flow passage article inlets comprises an apparatus body having a water inlet and an attachment head integral with the apparatus body. The attachment head includes a holder that receives the article therein in sealing contact with an article seal, and at least two ports, each port being in registry with at least one of the water flow passage article inlets. A water flow controller within the apparatus body has a controller inlet in water-flow communication with the water inlet, at least two controller outlets, with each controller outlet being in water-flow communication with one of the ports of the attachment head, and a flow-control valve disposed in a water flow path between the controller inlet and the controller outlets. The flow-control valve is controllable to controllably connect a single one of the controller outlets at a time to the controller inlet.

In one preferred embodiment, the holder comprises a jaw mechanism that engages the article on two opposite sides of the article when open and draws the article toward the article seal as the jaw moves toward a closed position. The holder may further comprise a spring that biases the jaw toward the closed position. The article seal comprises a piece of rubber with the at least two seal inlets therethrough. The flow-control valve comprises a valve bore in water-flow communication with each of the controller outlets, a valve core slidably received within the valve bore, the valve having a channel therethrough that may be slidably aligned with each controller outlet, and a sliding core seal at each end of the valve bore to slidingly seal the valve core to the valve bore.

Preferably, a water-flow testing apparatus is provided for testing a turbine airfoil component having at least two water flow passage turbine airfoil component inlets in a base thereof and an external dovetail region on an external surface of the base. The water-flow testing apparatus comprises an apparatus body having a water inlet, and an attachment head integral with the apparatus body. The attachment head includes an article seal, wherein the article seal comprises a piece of rubber with at least two seal inlets therethrough, each seal inlet being in registry with at least one of the at least two water flow passage turbine airfoil component inlets, and a holder that receives the turbine airfoil component therein in sealing contact with the article seal. The holder comprises a jaw mechanism having camming surfaces that engage the turbine airfoil component on the dovetail region when open and draws the base of the turbine airfoil component toward the article seal as the jaw mechanism moves toward a closed position. A spring biases the jaw mechanism toward the closed position. A water flow controller within the apparatus body has a controller inlet in water-flow communication with the water inlet, at least two controller outlets, with each controller outlet being in water-flow communication with one of the seal inlets of the attachment head, and a flow-control valve disposed in a water flow path between the controller inlet and the controller outlets. The flow-control valve is controllable to controllably connect a single one of the controller outlets at a time to the controller inlet. The flow-control valve comprises a valve bore in water-flow communication with each of the controller outlets, a valve core slidably received within the valve bore, with the valve core having a channel therethrough that may be slidable aligned with each controller outlet, and a sliding core seal at each end of the valve bore to slidingly seal the valve core to the valve bore.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
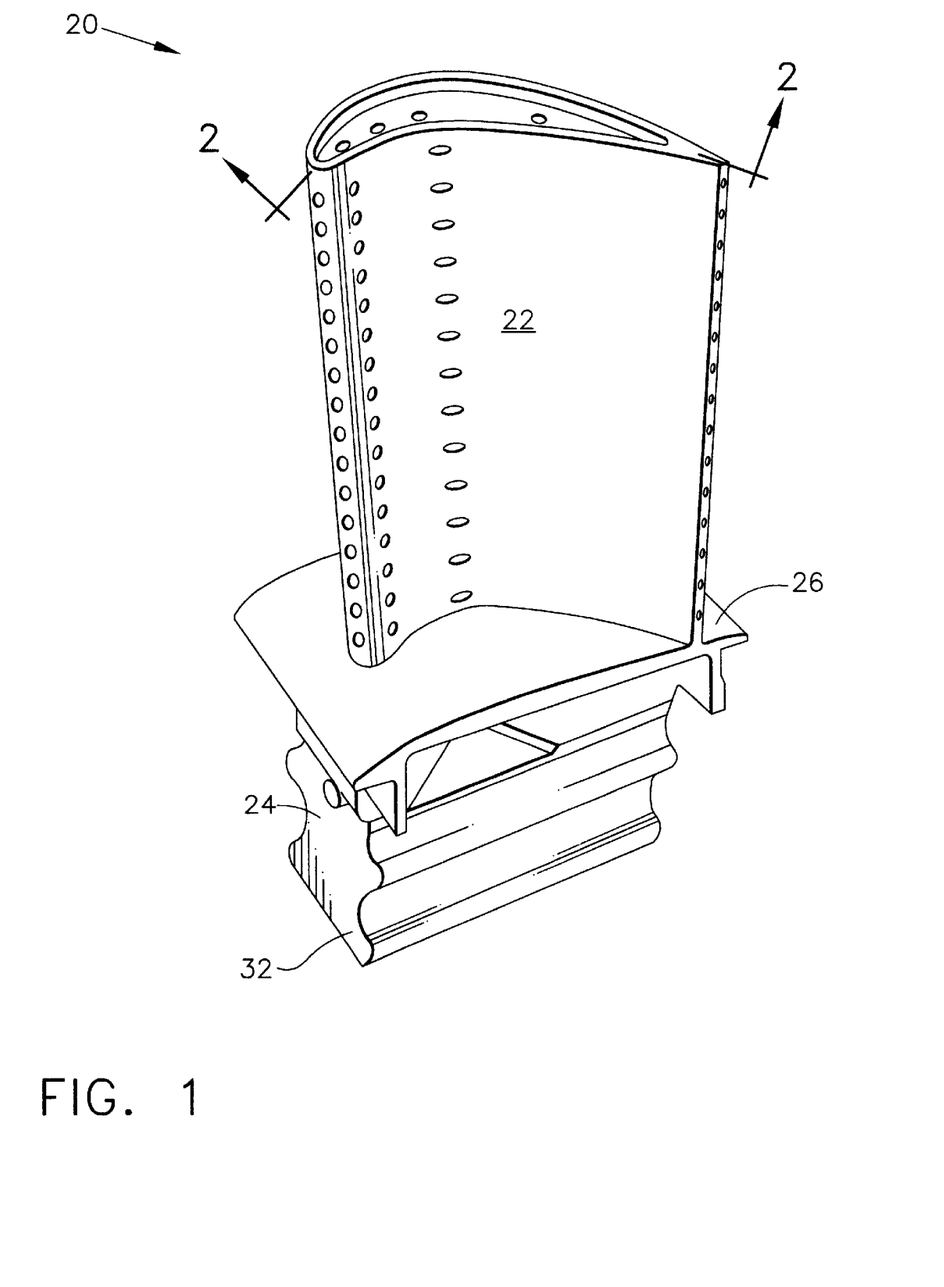
FIG. 1 is a perspective view of a turbine airfoil component.

FIG. 1 depicts a turbine airfoil component 20, in this case a turbine blade for an aircraft gas turbine engine. The turbine airfoil component 20 is formed of any operable material, but is preferably a nickel-base superalloy. The turbine airfoil component 20 includes an airfoil 22 against which the flow of hot exhaust gas is directed. The turbine airfoil component 20 is mounted to a turbine disk (not shown) by a dovetail 24 which extends downwardly from the airfoil 22 and engages a slot on the turbine disk. A platform 26 extends outwardly from the area where the airfoil 22 joins the dovetail 24.

Figure 2:
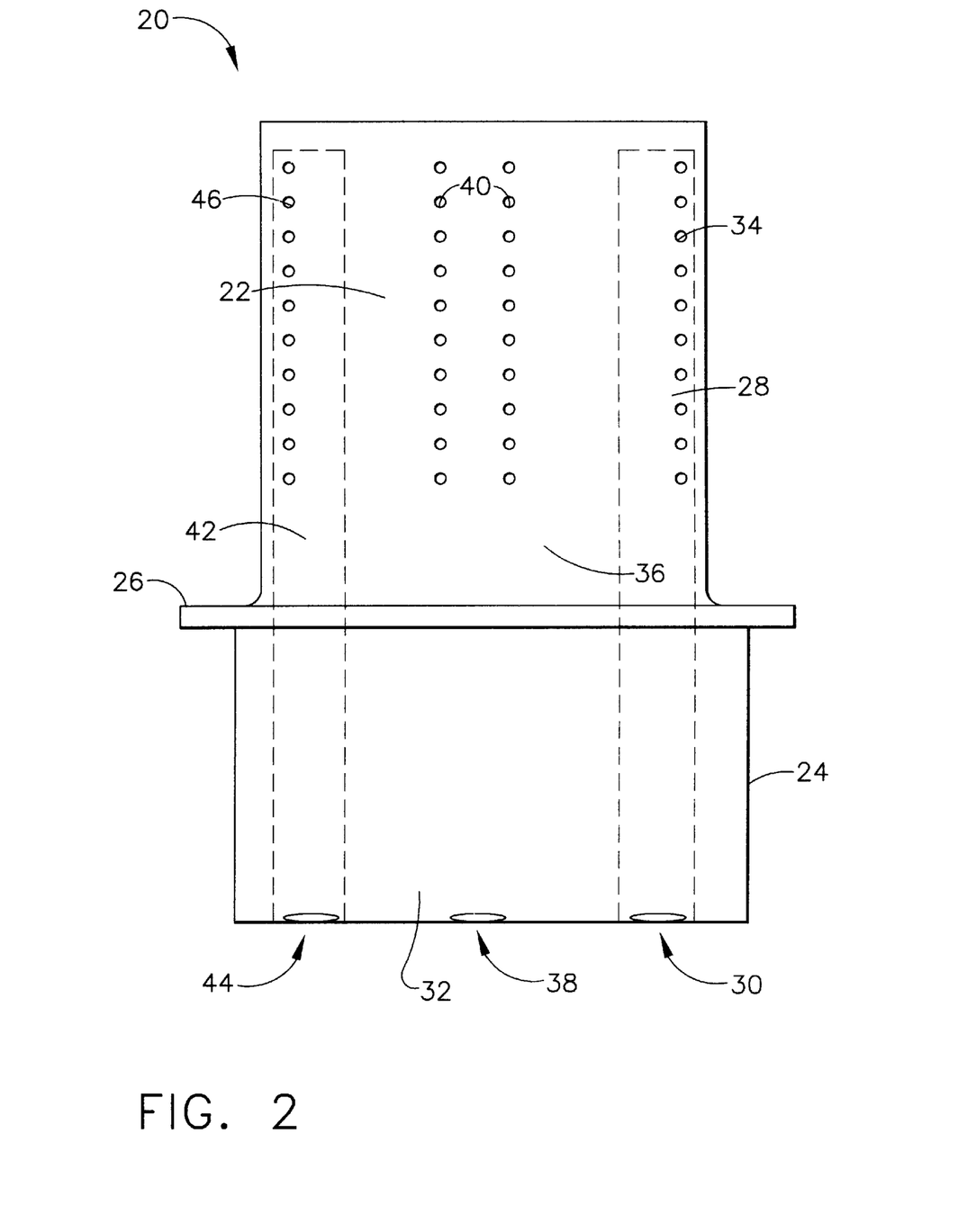
FIG. 2 is a sectional view of the turbine airfoil component of FIG. 1, taken along line 2—2.

Internal passages extend through the interior of the turbine airfoil component 20, ending in openings in the surface of the airfoil 22. In service, a flow of cooling air is directed through the internal passages, to remove heat from the airfoil 22 and to create a film-cooling effect as the flow of air leaves the openings. In some designs, there are at least two, and typically more, internal passages, each ending in its own set of openings. FIG. 2 illustrates a case where the turbine airfoil component 20 has three internal passages and a separate set of openings associated with each of the internal passages. A first internal passage 28 extends from a first turbine airfoil component inlet 30 in a base 32 of the dovetail 24 to a first set of openings 34 on the leading-edge of the turbine airfoil component 20. A second internal passage 36 extends from a second turbine airfoil component inlet 38 in the base 32 of the dovetail 24 to a second set of openings 40 on the pressure (concave) face of the turbine airfoil component 20. A third internal passage 42 extends from a third turbine airfoil component inlet 44 in the base 32 of the dovetail 24 to a third set of openings 46 on the trailing-edge of the turbine airfoil component 20.

When the turbine airfoil component is manufactured, the respective passages and sets of openings are tested with a flow of water that passes into the turbine airfoil component inlets, along the passages, and out the openings. In conventional practice, the water flow is directed into all of the turbine airfoil component inlets at the same time so that water flows from all of the openings at the same time. This approach makes observation of the flows from the various openings difficult. In the present approach, on the other hand, water flows are controllably directed through individual ones or combinations of the passages and sets of openings.

Figure 3:
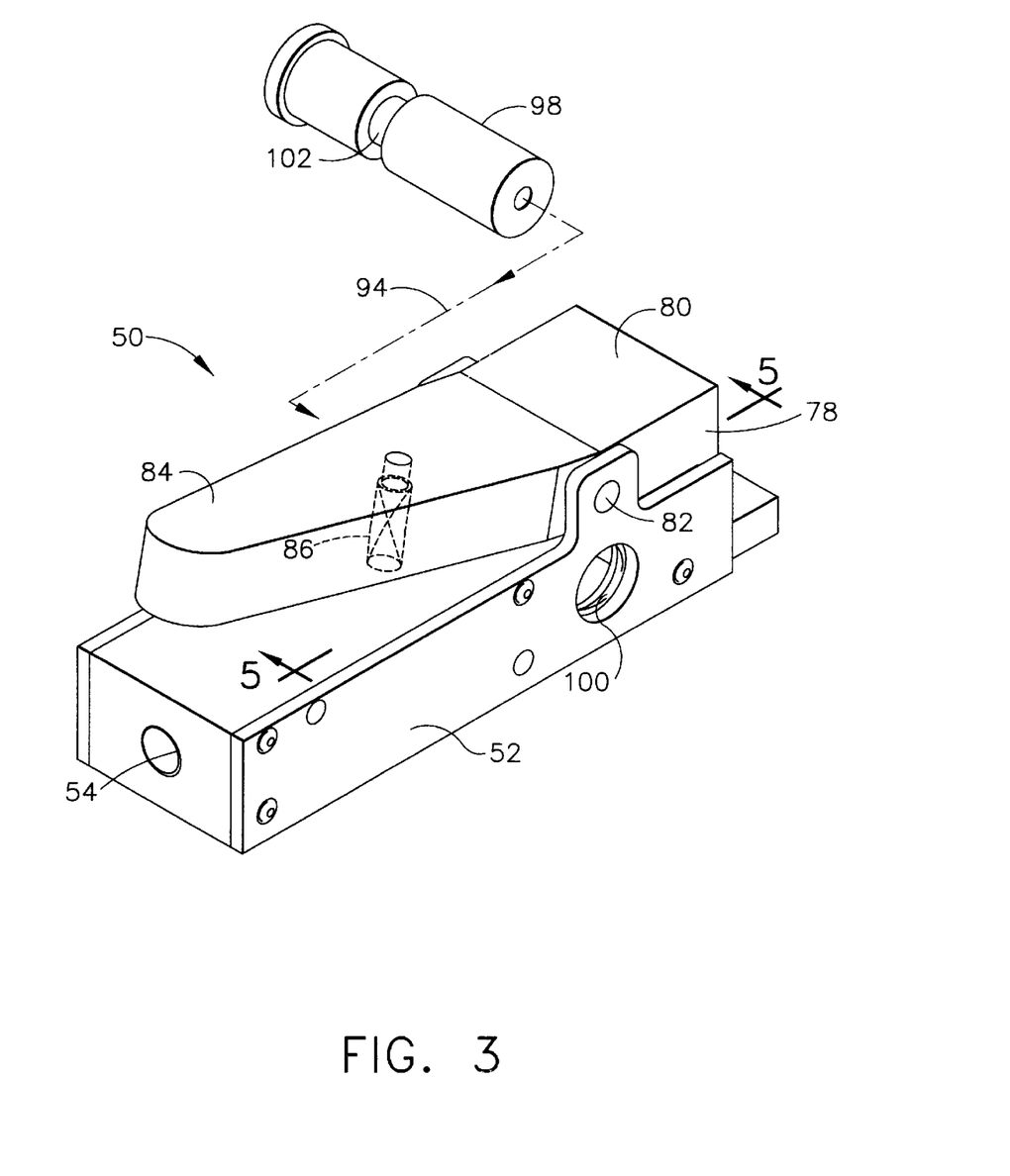
FIG. 3 is a partially exploded perspective view of a water-flow testing apparatus for testing the turbine airfoil component.
Figure 4:
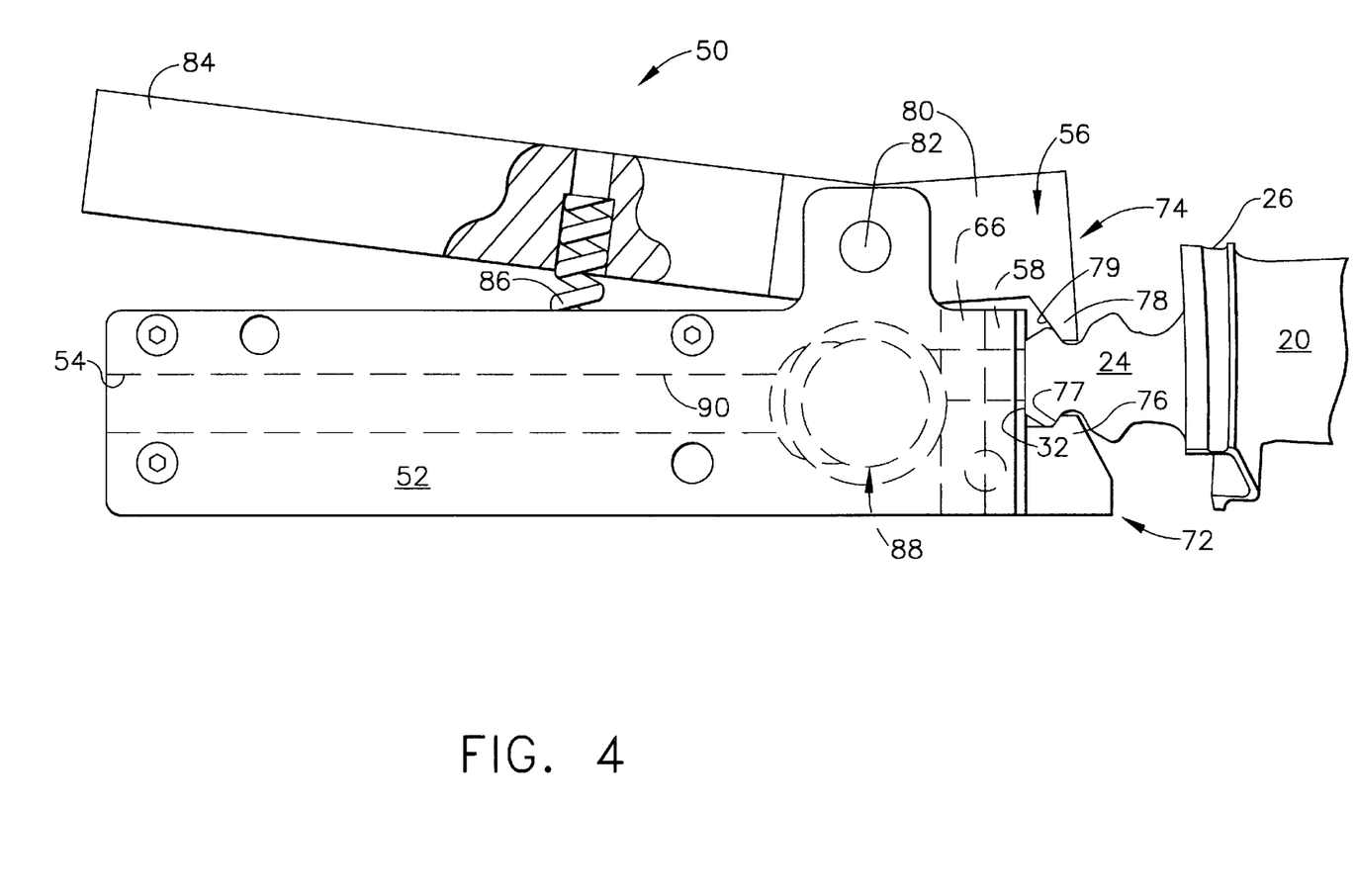
FIG. 4 is an elevational view of the water-flow testing apparatus of FIG. 3, with a portion in section and with a turbine airfoil component in position for water-flow testing.

FIGS. 3–9 depict a preferred water-flow testing apparatus 50 for water-flow testing the turbine airfoil component 20 having at least two, and in this case three, water flow passage turbine airfoil component inlets 30, 38, and 44 in the base 32. As seen in FIGS. 3–4, the apparatus 50 has an apparatus body 52 having a water inlet 54.

Referring to FIG. 4, an attachment head 56 is integral with the apparatus body 52. The attachment head 56 temporarily attaches the article being water-flow tested, in this case the turbine airfoil component 20, to the apparatus body 52 for the period of the water flow testing. The attachment head 56 includes an article seal 58 that seals the base 32 of the dovetail 24 of the turbine airfoil component 20 to the apparatus body 52. The article seal 58, shown in detail in FIG. 9, preferably is a piece of rubber with at least two seal inlets therethrough, with each seal inlet being in registry with at least one of the water flow passage inlets. In this case, the article seal 58 has three seal inlets 60, 62, and 64. Each one of the seal inlets 60, 62, and 64 is in registry with a respective one of the turbine airfoil component inlets 30, 38, and 44.

Figure 8:
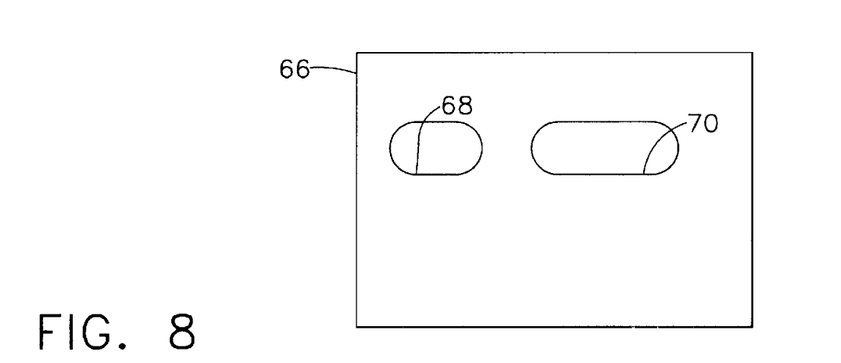
FIG. 8 is an elevational view of the water-flow distribution plate of the water-flow controller.
Figure 9:
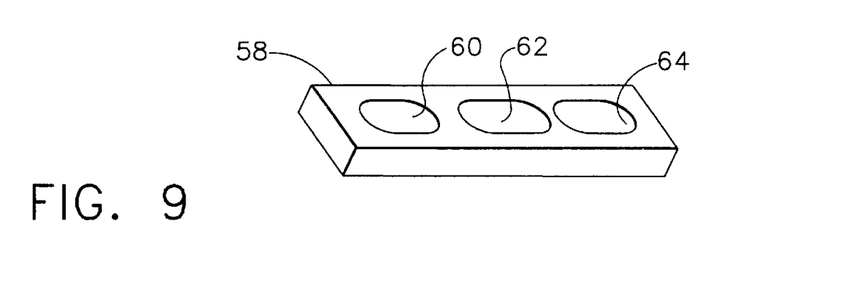
FIG. 9 is a perspective view of the seal between the water-flow testing apparatus and the turbine airfoil component.

A water-flow distribution plate 66, shown in FIG. 8, is positioned so that the article seal 58 lies between the water-flow distribution plate 66 and the base 32 of the dovetail 24 of the turbine airfoil component 20. The water-flow distribution plate 66 allows water to be directed into individual ones of the seal inlets 60, 62, and 64, or selected combinations of the seal inlets 60, 62, and 64, and thence into the respective turbine airfoil component inlets 30, 38, and 44. In the illustrated case, water is to be directed into the seal inlet 60 by itself, or alternatively into the seal inlets 62 and 64 together. To this end, the water-flow distribution plate 66 has a first distribution plate outlet 68 that aligns with and communicates with the seal inlet 60, and a second distribution plate outlet 70 that aligns with and communicates with the seal inlets 62 and 64.

A holder 72 receives the turbine airfoil component 20 and holds the base 32 of the dovetail 24 in sealing contact with the article seal 58. The holder 72 preferably comprises a jaw mechanism 74 including a fixed jaw 76 located on the apparatus body 52 and a movable jaw 78. The movable jaw 78 is at the end of a pivot arm 80 that is pivotably fixed to the apparatus body 52 at a pivot point 82. A handle 84 of the pivot arm 80 on the opposite side of the pivot point 82 from the movable jaw 78 may be depressed to open the jaw mechanism 74 and move the jaws 76 and 78 apart from each other so that the base 32 may be inserted between the jaws 76 and 78. The handle 84 is then released to capture the base 32 between the jaws 76 and 78. A compression spring 86 extends between the handle 84 and the apparatus body 52 to bias the jaw mechanism 74 to the closed position with the base 32 captured between the jaws 76 and 78. The jaws 76 and 78 have respective camming surfaces 77 and 79 that engage the turbine airfoil component 20 on the dovetail region 24 when open and draw the base 32 of the turbine airfoil component 20 toward and into sealing contact with the article seal 58 as the jaw mechanism 74 moves toward the closed position.

The jaw mechanism 74 engages the article being water-tested, here the turbine airfoil component 20, and holds it in sealing contact with the article seal 58 during water testing. The use of the jaw mechanism allows the person doing the water testing to make this engagement and seal with a simple, easily performed grasping action that opens and closes the jaw mechanism, rather than a twisting action or other complex action. The jaw approach is more ergonomic than these other possible approaches.

Figure 5:
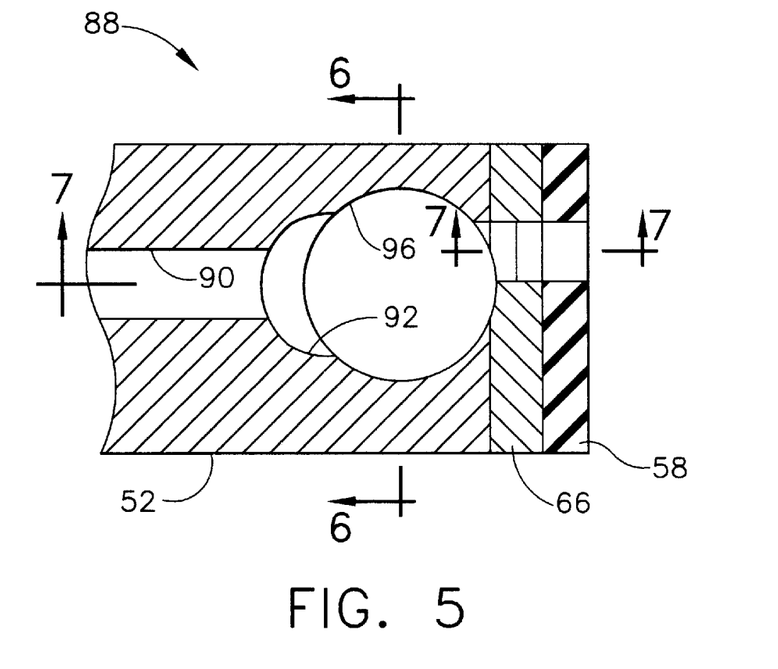
FIG. 5 is a sectional view of the water-flow controller of the water-flow testing apparatus, taken on line 5—5 of FIG. 3.
Figure 6:
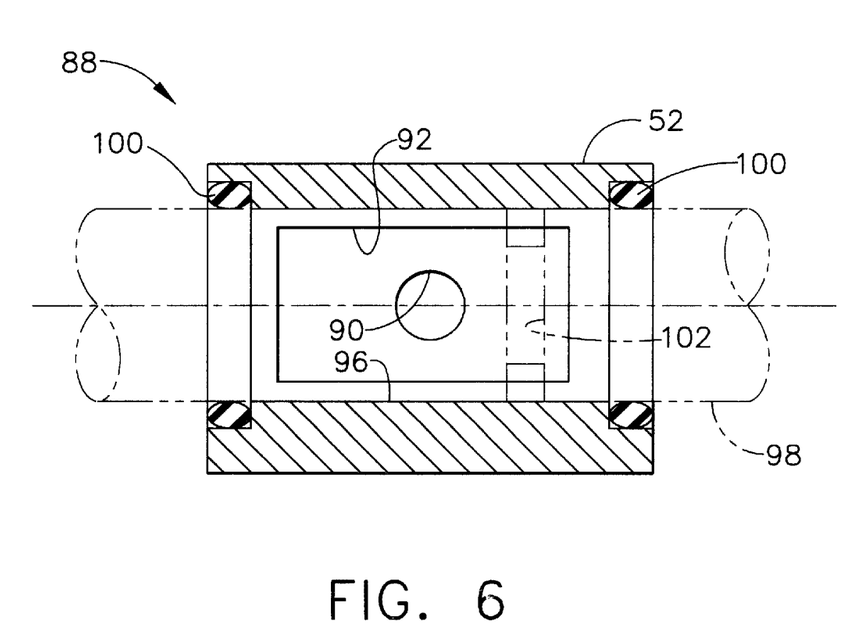
FIG. 6 is a sectional view of the water-flow controller, taken on line 6—6 of FIG. 5.
Figure 7:
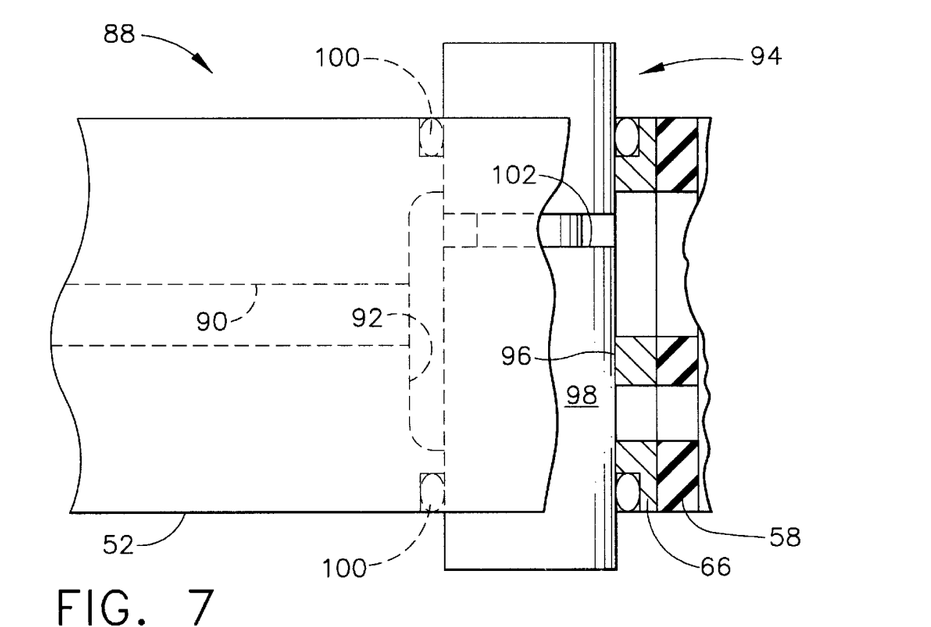
FIG. 7 is a sectional view of the water-flow controller of FIG. 5, taken along line 7—7 of FIG. 5.

A water flow controller 88, illustrated in FIGS. 5–7, is located within the apparatus body 52 to control the flow of water from the water inlet 54 to the seal inlets 60, 62, and 64, and thence into the respective turbine airfoil component inlets 30, 38, and 44. The water flow controller 88 has a controller inlet 90 in water-flow communication with the water inlet 54 of the apparatus body 52. The controller inlet 90 communicates with an inlet plenum 92 of the water flow controller 88. The water flow controller 88 has at least two controller outlets. In this case, the controller outlets are the distribution plate outlets 68 and 70 of the distribution plate 66. Each controller outlet is in water-flow communication with at least one of the seal inlets 60, 62, and 64.

A flow-control valve 94 of the water flow controller 88 is disposed in a water flow path between the controller inlet 90 and the distribution plate outlets 68 and 70. The flow-control valve 94 is controllable to controllably connect a single one of the distribution plate outlets 68 and 70 at a time to the controller inlet 90. The flow-control valve may be of any operable type. In a preferred embodiment, the flow control valve 94 is a slide-actuated valve. The slide flow control valve 94 includes a valve bore 96 that extends transversely (i.e., parallel to the pivot pin at the pivot point 82) between the sides of the apparatus body 52. The valve bore 96 is in water-flow communication with the inlet plenum 92, and thence with the controller inlet 90 and the water inlet 54 on one side, and with each of the distribution plate outlets 68 and 70 on the other side. A generally cylindrically symmetric valve core 98 is slidably received within the valve bore 96 and is sealed to the valve bore 96 at each end with O-ring seals 100. The sliding valve core 98 has a channel 102 therethrough that may be slidable aligned with each distribution plate outlet 68 and 70. In the illustrated embodiment, the channel 102 is a circumferential channel that provides water flow regardless of whether the valve core 98 is rotated about its longitudinal axis.

To operate the water-flow testing apparatus 50, the water inlet 54 is connected to any operable source of water and water pressure. The inventors have found a water pressure of from about 20 to about 30 psi to be satisfactory, although the invention is not so limited. The handle 84 is depressed and the turbine airfoil component 20 is inserted between the jaws 76 and 78. The handle 84 is released, so that the dovetail 24 of the turbine airfoil component 20 is captured between the camming surfaces 77 and 79 of the jaws 76 and 78, thereby sealing the base 32 to the article seal 58. The valve core 98 of the water-flow controller 88 is moved longitudinally within the valve bore 96 to establish a water flow path between the pressurized water inlet 54 and either of the outlets 68 or 70, one at a time. This allows the water flow to be directed into the internal passages 28, 36, and 42, and thence to the respective sets of openings 34, 40, and 46 of the turbine airfoil component 20. Flow from the sets of openings is observed to determine whether each opening is freely flowing or is obstructed. When water flow testing is complete, the handle 84 is depressed, and the turbine airfoil component 20 is removed from the jaw mechanism 74.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A water-flow testing apparatus for testing an article having at least two water flow passage article inlets, comprising:

an apparatus body having a water inlet;

an attachment head integral with the apparatus body, the attachment head including
  a holder that receives the article therein in sealing contact with an article seal, and
  at least two ports, each port being in registry with at least one of the at least two water flow passage article inlets; and a water flow controller within the apparatus body, the water flow controller having
  a controller inlet in water-flow communication with the water inlet,
  at least two controller outlets, each controller outlet being in water-flow communication with one of the ports of the attachment head, and
  a flow-control valve disposed in a water flow path between the controller inlet and the controller outlets, the flow-control valve being controllable to controllably connect a single one of the controller outlets at a time to the controller inlet.

2. The apparatus of claim 1, wherein the holder comprises a jaw mechanism that engages the article on two opposite sides of the article when open and draws the article toward the article seal as the jaw mechanism moves toward a closed position.

3. The apparatus of claim 2, wherein the holder further comprises
a spring that biases the jaw mechanism toward the closed position.

4. The apparatus of claim 1, wherein the article seal comprises a piece of rubber with the at least two seal inlets therethrough.

5. The apparatus of claim 1, wherein the flow-control valve comprises
  a valve bore in water-flow communication with each of the controller outlets,
  a valve core slidably received within the valve bore, the valve core having a channel therethrough that may be slidably aligned with each controller outlet, and
  a sliding core seal at each end of the valve bore to slidingly seal the valve core to the valve bore.

6. The apparatus of claim 1, further including
a turbine airfoil component article having at least two water flow passage article inlets.

7. A water flow testing apparatus for testing an article having at least two water flow passage article inlets, comprising:

the article having at least two water flow passage article inlets;

an apparatus body having a water inlet;

an attachment head integral with the apparatus body, the attachment head including
  a holder that receives the article therein sealing contact with an article seal, and at least two ports, each port being in registry with at least one of the at least two water flow pass passage article inlets; and a water flow controller within the apparatus body, the water flow controller having
- a controller inlet in water-flow communication with the water inlet,
- at least two controller outlets, each controller outlet being in water-flow communication with one of the ports of the attachment head, and
- a flow control valve disposed in a water flow path between the controller inlet and the controller outlets, the flow-control valve being controllable to controllably connect a single one of the controller outlets at a time to the controller inlet.

8. A water-flow testing apparatus for testing a turbine airfoil component having at least two water flow passage turbine airfoil component inlets in a base thereof and an external dovetail region on an external surface of the base, comprising:

an apparatus body having a water inlet;

an attachment head integral with the apparatus body, the attachment head including
- an article seal, wherein the article seal comprises a piece of rubber with at least two seal inlets therethrough, each seal inlet being in registry with at least one of the at least two water flow passage turbine airfoil component inlets;
- a holder that receives the turbine airfoil component therein in sealing contact with the article seal, and wherein the holder comprises
- a jaw mechanism having camming surfaces that engage the turbine airfoil component on the dovetail region when open and draws the base of the turbine airfoil component toward the article seal as the jaw mechanism moves toward a closed position, and
- a spring that biases the jaw mechanism toward the closed position; and a water flow controller within the apparatus body, the water flow controller having
- a controller inlet in water-flow communication with the water inlet,
- at least two controller outlets, each controller outlet being in water-flow communication with one of the seal inlets of the attachment head, and
- a flow-control valve disposed in a water flow path between the controller inlet and the controller outlets, the flow-control valve being controllable to controllably connect a single one of the controller outlets at a time to the controller inlet, wherein the flow-control valve comprises
  - a valve bore in water-flow communication with each of the controller outlets,
  - a valve core slidably received within the valve bore, the valve core having a channel therethrough that may be slidably aligned with each controller outlet, and
  - a sliding core seal at each end of the valve bore to slidingly seal the valve core to the valve bore.

* * * * *